United States Patent [19]

Yamazaki

[11] Patent Number: 5,600,469
[45] Date of Patent: Feb. 4, 1997

[54] OPTICAL NETWORK UNIT IMPLEMENTED WITH LOW-COST LINE INTERFACE CARDS

[75] Inventor: Shuntaro Yamazaki, Tokyo, Japan

[73] Assignee: NEC Corporation, Tokyo, Japan

[21] Appl. No.: 542,875

[22] Filed: Oct. 13, 1995

[30] Foreign Application Priority Data

Oct. 13, 1994 [JP] Japan .................................. 6-247927

[51] Int. Cl.⁶ ...................................................... H04J 14/08
[52] U.S. Cl. ......................... 359/135; 359/123; 359/137; 370/395; 370/466; 375/220
[58] Field of Search ....................... 359/123, 135, 359/137, 163, 173; 370/60, 60.1, 84, 94.1, 94.2, 110.1; 375/220, 225

[56] References Cited

U.S. PATENT DOCUMENTS 5,430,722  7/1995  Jacob et al. .............................. 359/123
5,455,701  10/1995 Eng et al. ................................ 359/135

*Primary Examiner*—Wellington Chin
*Assistant Examiner*—Kinfe-Michael NeGash
*Attorney, Agent, or Firm*—Sughrue, Mion, Zinn, Macpeak & Seas

[57] ABSTRACT

In an optical network unit of an optical access network, an optical receiver is connected through a single-mode fiber optic link to a central office for receiving therefrom an ATM cells having a rate in conformance to the transmission capacity of the link. Multiple line interface cards are associated respectively with subscriber drop lines. Each of the line interface cards comprises an address filter having a uniquely assigned address for extracting, from the output of the optical receiver, ATM cells having a VCI corresponding to the assigned address, a first speed converter for converting the extracted ATM cells to a signal having a rate conforming to the transmission capacity of the associated drop line, a second converter for converting a signal from the drop line to ATM cells having a rate conforming to the transmission capacity of the single-mode fiber optic link, interface for interfacing the first and second converters with the drop line, and a buffer for storing the ATM cells from the second converter. ATM cells stored in the buffers of the line interface cards are multiplexed into an ATM cell stream and transmitted through the single-mode fiber optic link to the central office.

7 Claims, 2 Drawing Sheets

OPTICAL NETWORK UNIT IMPLEMENTED WITH LOW-COST LINE INTERFACE CARDS

BACKGROUND OF THE INVENTION

1. Field of the Invention

The present invention relates generally to optical access networks, and more particularly to an optical network unit for use in optical access networks.

2. Description of the Related Art

In an optical subscriber access network, the use of single-mode optical fiber is contemplated as a transmission medium between a central office and subscribers. A number of topologies such as FTTH, FTTC and FTTB have been proposed for an optical network unit (ONU) for terminating optical fibers. The FTTH (fiber-to-the-home) is one in which the optical network unit is located in a subscriber premises, the FTTC (fiber-to-the-curb) is one in which the optical network unit is located in a curb, and with the FTTB (fiber-to-the-building) the ONU is located within a building or an apartment house. With the FTTC and FTTB topologies, the connections between the ONU and a terminating equipment at subscriber premises are called drop lines which are currently contemplated as comprising twisted pairs of copper wires or a coaxial cable. A proposed future access network for broadband ISDN employs single-mode optical fibers for application to drop lines.

However, the installation of a single-mode optical fiber as a drop line between a subscriber and an optical network unit is a costly investment, particularly its optical interface. This would represent an obstacle to the deployment of broadband optical networks and services.

While the single-mode optical fiber operates at wavelengths outside of the visible spectrum, plastic and plastic-clad fibers operate in the visible spectrum. Since the visible spectrum operation permits the use of conventional microelectronic technologies for implementing optical interface, the optical interface of the plastic and plastic-clad optical fibers is much less costly than that of the interface of the single-mode optical fiber, although the transmission medium cost of the plastic and plastic-clad fibers is comparable to that of the single-mode fiber. Additionally, multimode optical fiber is much less expensive than single-mode optical fiber.

SUMMARY OF THE INVENTION

It is therefore an object of the present invention to provide low-cost implementation of subscriber optical networks of the FTTC and FTTB topologies with a variety of drop lines which meet varied subscriber needs.

According to the present invention, there is provided an optical network unit for an optical access network, comprising an optical receiver connected through a single-mode fiber optic link to a central office for receiving therefrom an ATM (asynchronous transfer mode) cells having a rate conforming to the transmission capacity of the single-mode fiber optic link. A plurality of line interface cads are associated respectively with drop lines connected to subscribers. Each of the line interface cards comprises an address filter having a uniquely assigned address for extracting, from the output of the optical receiver, ATM cells having a virtual channel identifier corresponding to the assigned address, first converting means for converting the extracted ATM cells to a signal having a rate conforming to the transmission capacity of the associated drop line, second converting means for converting a signal from the drop line to ATM cells having a rate conforming to the transmission capacity of the single-mode fiber optic link, interface means for interfacing the first and second converting means with the associated drop line, and a buffer for storing the ATM cells from the second converting means. ATM cells stored in the buffers of the line interface cards are multiplexed into an ATM cell stream, which is then transmitted through the single-mode fiber optic link to the central office.

The drop line may be a multimode optical fiber, a plastic optical fiber, a plastic-clad optical fiber, a coaxial cable or a twisted pair of copper wires.

Each line interface card may be further associated with a second drop line having a different transmission capacity than the transmission capacity of the first drop line. In this case, the address filter is additionally assigned two values respectively indicating the first and second drop lines for extracting first ATM cells having a type field corresponding to a first one of the assigned values and applying the extracted first ATM cells to the first converting means and extracting second ATM cells having a type field corresponding to a second one of the assigned values. The line interface car& further includes third converting means for converting the extracted second ATM cells to a signal having a rate conforming to the transmission capacity of the second drop line, fourth converting means for converting a signal from the second drop line to ATM cells having a rate conforming to the transmission capacity of the single-mode fiber optic link, and second interface means for interfacing the third and fourth converting means with the second drop line. The buffer of the line interface card additionally stores ATM cells from the fourth converting means.

BRIEF DESCRIPTION OF THE DRAWINGS

The present invention will be described in further detail with reference to the accompanying drawings, in which.

DETAILED DESCRIPTION

Figure 1A:
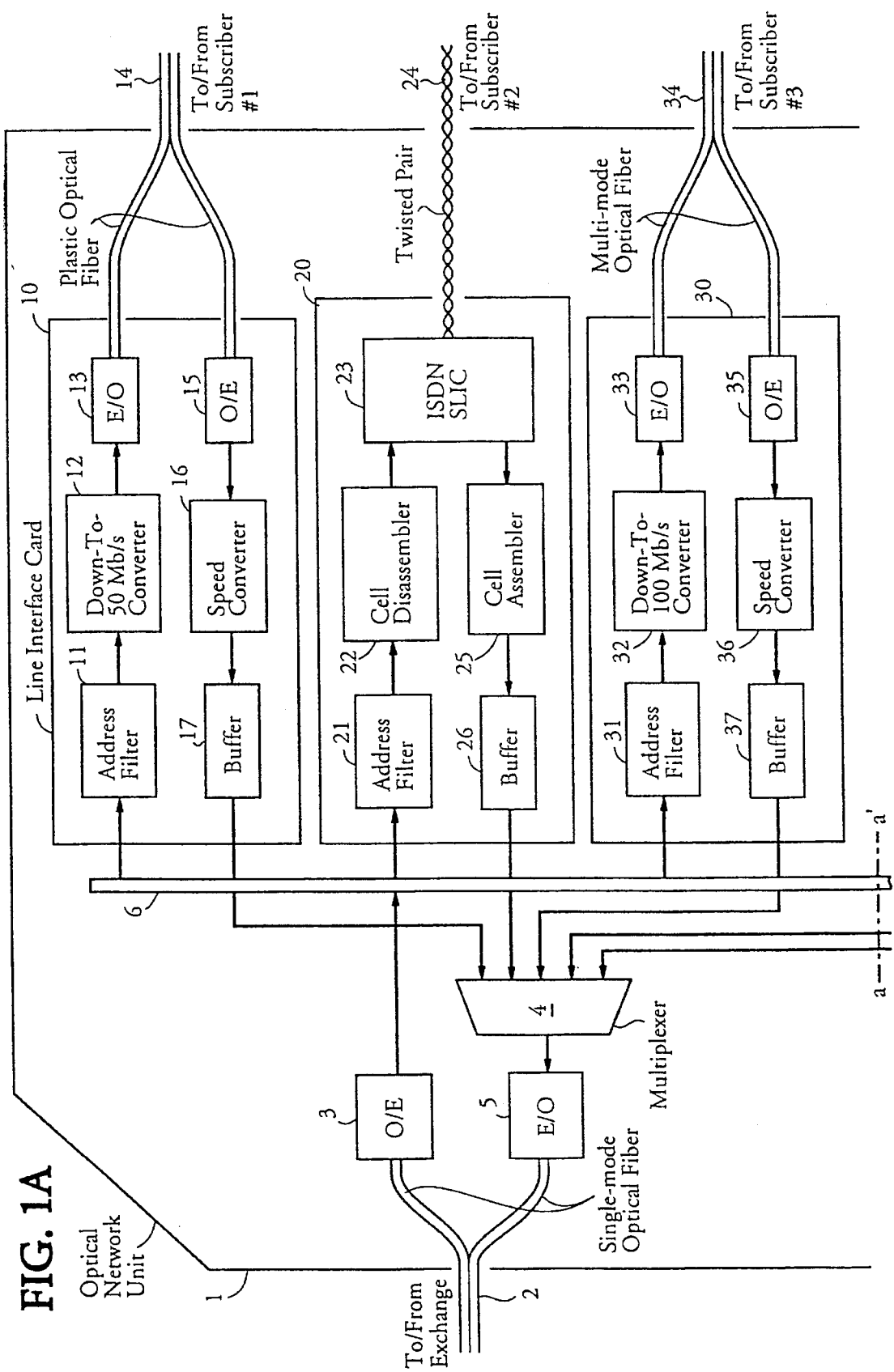
FIGS. 1A and 1B are block diagrams of an optical network unit according to the present invention.

An optical network unit of the present invention, generally shown at 1 in FIG. 1A, is connected to an exchange system, or central office, not shown, through single-mode fiber optic links 2 that support 156-Mb/s ATM cells in opposite directions. The ONU 1 comprises an optoelectric converter 3 connected to the end of the downward path of the links 2 to provide an amplification and optoelectrical conversion on the downlink optical ATM cells for coupling to a high speed bus 6. To the bus 6 are connected a plurality of line interface cards 10, 20 and 30. Line interface cards 10, 20 and 30 are associated respectively with subscribers #1, #2 and #3 through drop lines 14, 24 and 34.

Drop lines 14 are plastic fiber optic links. The associated line interface card 10 includes an address filter 11 that examines the VCI (virtual channel identifier) field of each incoming ATM cell and passes it to a speed converter 12 if the VCI of the cell matches an address uniquely assigned to the address filter 11. In the speed converter 12, the 156-Mb/s ATM cell is reduced to a rate 50 Mb/s and supplied to an electrooptic converter, or optical transmitter 13, from which 50-Mb/s optical ATM cells are transmitted through the downward path of the plastic fiber links 14 to the premises of subscriber #1. Optical ATM cells at the rate of 50 Mb/s are transmitted from subscriber #1 through the upward path of the plastic fiber links 14 to the associated line interface card 10 where they are converted to an electrical signal in an optoelectric converter, or optical receiver 15 and fed to a speed converter 16 where the speed of the ATM cells is converted m the rate 156 Mb/s of the single-mode fiber optic links 2. The output of speed converter 16 is stored in a buffer 17 until appropriate dining, at which point it is forwarded to the multiplexer 4.

Drop line 24 is a twisted pair of copper wires. The associated line interface card 20 includes an address filter 21 that extracts and passes 156-Mb/s ATM cells to a cell disassembler 22 if their VCI matches the assigned address of the filter 21. In the cell disassembler 22, the 156-Mb/s ATM cells are disassembled to a 64 kb/s data stream and supplied to an ISDN (integrated services digital network) subscriber line interface circuit (SLIC) 23 where the 64-kb/s signal is coupled by a digital hybrid circuit to the twisted pair 24 and transmitted to the premises of subscriber #2. Signals at 64 kb/s from subscriber #2 are transmitted through the twisted pair 24 to the SLIC 23 where they are coupled to a cell assembler 26 in which the signals are time-compressed and assembled into 156-Mb/s ATM cells. The output of speed converter 26 is applied to a buffer 27 where the signal is placed in a queue waiting for appropriate timing to be forwarded to the multiplexer 4.

Drop lines 34 are step-index multimode fiber optic links. The associated line interface card 30 includes an address filter 31 that extracts and forwards 156-Mb/s ATM cells to a speed down-converter 32 if their VCI matches the assigned address of the filter 31. In the speed converter 32, the 156-Mb/s ATM cells are slowed down to a rate of 100 Mb/s and supplied to an E/O converter 33 and transmitted through the downward link of the multimode fiber optic links 34 to the premises of subscriber #3. Optical signals at 100 Mb/s from subscriber #3 are transmitted through the upward link of the multimode fiber optic links 34 to the associated line interface card 30 where they are received by an O/E converter 35 and fed to a speed converter 36 where they are converted to 156 Mb/s ATM cells. The output of speed converter 36 is stored in a buffer 37 to wait for delivery to the multiplexer 4.

The outputs of the buffers 17, 27 and 37 are statistically multiplexed in the multiplexer 4 to provide a 156-Mb/s ATM cell stream to an E/O converter 5 to be launched into the upward link of the single-mode fiber optic links 2.

Figure 1B:
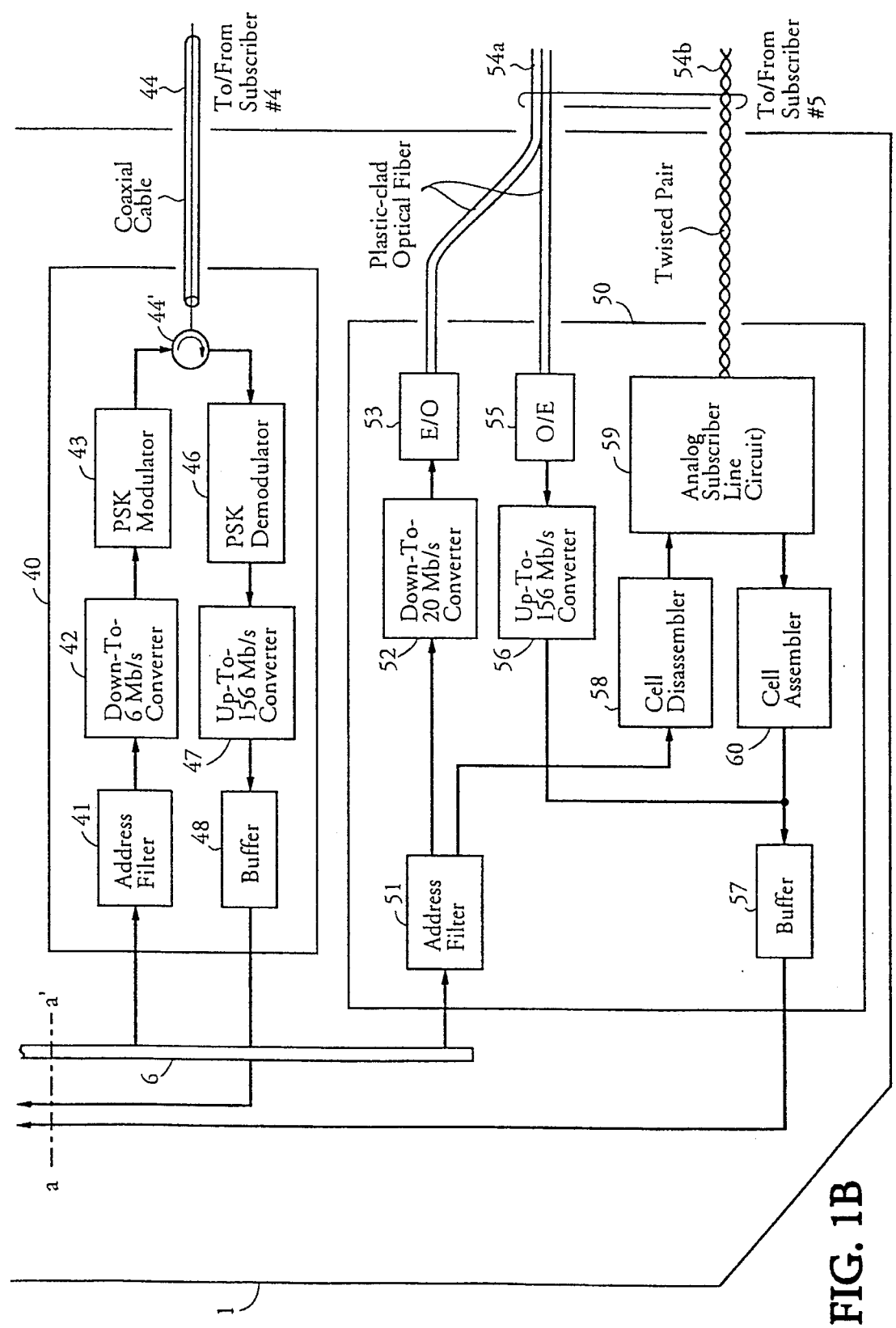

As illustrated in FIG. 1B, the optical network unit 1 may further include line interface cards 40 and 50 associated respectively with subscribers #4 and #5. Line interface card 40 is connected to the subscriber #4 by a coaxial cable 44, while line interface card 50 is connected to the subscriber #5 via plastic-clad optical fibers 54a and a twisted pair of wire 54b.

Line interface card 40 includes an address filter 41 connected to the bus 6 for filtering specified ATM cells to a speed converter 42 in which the ATM cell is slowed down to as low as 6 Mb/s. The output of speed converter 42 is applied to a PSK (phase shift keyed) modulator 43 where it is modulated on a 100-kHz carrier and transmitted via a directional coupler 44' through the coaxial cable 44 to the premises of subscriber #4. A 20-Mb/s signal from subscriber #4 is modulated on a 200-MHz carrier, for example, and conveyed through the coaxial cable 44 to a PSK demodulator 46 for recovering the 20-Mb/s baseband signal. The recovered baseband signal is converted to 156-Mb/s ATM cells in a speed converter 47 and stored in a buffer 48 for delivery to the multiplexer 4 at appropriate timing.

Line interface card 50 includes an address filter 51 having an assigned VCI and assigned type field values respectively associated with data to be sent via plastic-clad optical fiber 54a and those to be sent via twisted pair 54b. ATM calls on bus 6 are filtered depending on the assigned VCI and type field values and the filtered ATM cells are applied to a speed converter 52 or a cell disassembler 58. If speed converter 52 is selected, the 156-Mb/s ATM cell from address filter 51 is reduced to a rate 20 Mb/s and transmitted from an optical transmitter 53 via the downward path of plastic-clad fiber links 54a to the premises of subscriber #5. A 20 Mb/s signal from subscribe #5 is carried through the upward path of plastic-clad fiber links 54a to an optical receiver 55 whose output is coupled to a speed converter 56 where it is converted to 156-Mb/s ATM cells and stored in a buffer 57 for delivery to multiplexer 4.

If cell disassembler 58 is selected, the ATM cells are disassembled to a 64-kb/s signal and supplied to an analog subscriber line circuit 59 having known BORSCHT functions, i.e., battery feed, overvoltage protection, ringing, supervision, codec, hybrid and testing. The 64-kb/s downward digital signal is converted in the line circuit 59 to an analog voice frequency signal and coupled through the twisted pair 54b to a POTS (plain old telephone set) in the premises of subscriber #5. Upward analog voice frequency signals from the POTS telephone are converted to 64 kb/s upward digital signals in the line circuit 59 and applied to a cell assembler 60 where they are assembled into 156-Mb/s ATM cells and stored into buffer 57 for delivery to multiplexer 4.

While two optical fibers are used for links 2 and drop lines 14, 34 and 54a for two-way transmission, only one optical fiber could be used in each case by employing wavelength division multiplex technology or other multiplexing schemes.

What is claimed is:

1. An optical network unit for an optical access network, comprising:

an optical receiver connected through a single-mode fiber optic link to a central office for receiving therefrom an ATM (asynchronous transfer mode) cells having a rate conforming to the transmission capacity of the single-mode fiber optic link;

a plurality of line interface cards associated respectively with drop lines connected to subscribers, each of the line interface cards comprising:

an address filter having a uniquely assigned address for extracting, from the output of said optical receiver, ATM cells having a virtual channel identifier corresponding to the assigned address;

first converting means for converting the extracted ATM cells to a signal having a rate conforming to the transmission capacity of the associated drop line;

second converting means for converting a signal from said drop line to ATM cells having a rate conforming to the transmission capacity of said single-mode fiber optic link;

interface means for interfacing the first and second converting means with said associated drop line; and a buffer for storing the ATM cells from the second converting means;

a multiplexer for multiplexing ATM cells stored in the buffers of said line interface cards and producing an ATM cell stream; and an optical transmitter for transmitting the ATM cell stream through said single-mode fiber optic link to said central office.

2. An optical network unit as claimed in claim 1, wherein one of said line interface cards is further associated with a second drop line having a different transmission capacity than the transmission capacity of the first-named drop line, said address filter being additionally assigned two values respectively indicating the first and second drop lines for extracting first ATM cells having a type field corresponding to a first one of said assigned values and applying the extracted first ATM cells to said first converting means and extracting second ATM cells having a type field corresponding to a second one of said assigned values, said one of the line interface cards further comprising:

third converting means for converting the extracted second ATM cells to a signal having a rate conforming to the transmission capacity of said second drop line;

fourth converting means for converting a signal from said second drop line to ATM cells having a rate conforming to the transmission capacity of said single-mode fiber optic link; and second interface means for interfacing the third and fourth converting means with said second drop line, the buffer of said one line interface card additionally storing ATM cells from said fourth converting means.

3. An optical network unit as claimed in claim 1, wherein said drop line is one of a multimode optical fiber, a plastic optical fiber, a plastic-clad optical fiber, a coaxial cable and a twisted pair of copper wires.

4. An optical network unit as claimed in claim 1, wherein the associated drop line is one of a multimode optical fiber, a plastic optical fiber and a plastic-clad optical fiber, said interface means including an optical transmitter and an optical receiver for respectively interfacing said first and second converting means with the associated drop line.

5. An optical network unit as claimed in claim 1, wherein the associated drop line is a coaxial cable, said interface means including a phase shift keyed modulator and a phase shift keyed demodulator for respectively interfacing said first and second converting means with the coaxial cable.

6. An optical network unit as claimed in claim 1, wherein the associated drop line is a twisted pair of copper wires, said interface means including a subscriber line interface circuit for interfacing the first and second converting means with the twisted pair of copper wires.

7. An optical network unit as claimed in claim 1, wherein said line interface cards are associated respectively with a multimode optical fiber, a plastic optical fiber, a plastic-clad optical fiber, a coaxial cable and a twisted pair of copper wires as said drop lines, the first converting means of the line interface card associated with the multimode optical fiber including means for converting the extracted ATM cells to a signal having a rate corresponding to the transmission capacity of the multimode optical fiber, the first converting means of the line interface card associated with the plastic optical fiber including means for converting the extracted ATM cells to a signal having a rate corresponding to the transmission capacity of the plastic optical fiber, the first converting means of the line interface card associated with the plastic-clad optical fiber including means for converting the extracted ATM cells to a signal having a rate corresponding to the transmission capacity of the plastic-clad optical fiber, the first converting means of the line interface card associated with the coaxial cable including means for converting the extracted ATM calls to a signal having a rate corresponding to the transmission capacity of the coaxial cable, the first converting means of the line interface card associated with the twisted pair of copper wires including means for converting the extracted ATM cells to a signal having a rate corresponding to the transmission capacity of the twisted pair of copper wires.

* * * * *